United States Patent [19]

Videki, II

[11] 4,413,328
[45] Nov. 1, 1983

[54] STORAGE SUBSYSTEMS EMPLOYING REMOVABLE MEDIA AND HAVING A DIGITAL DISPLAY ON EACH RECORDER

[75] Inventor: Edwin R. Videki, II, Tucson, Ariz.

[73] Assignee: International Business Machines Corporation, Armonk, N.Y.

[21] Appl. No.: 241,168

[22] Filed: Mar. 6, 1981

[51] Int. Cl.³ .................. G06F 13/04; G06F 15/16
[52] U.S. Cl. ................................. 364/900; 360/69; 360/88; 360/91; 360/137
[58] Field of Search ... 364/200 MS File, 900 MS File; 360/137, 88, 91, 96.1, 98, 69

[56] References Cited

U.S. PATENT DOCUMENTS

| | | |
|---|---|---|
| 3,260,999 | 7/1966 | Grammer . |
| 3,573,749 | 4/1971 | Smith et al. . |
| 3,838,291 | 9/1974 | Marion et al. ................ 250/571 |
| 3,906,457 | 9/1975 | Mattedi et al. ................ 364/900 |
| 3,939,453 | 2/1976 | Schroeder . |
| 4,079,449 | 3/1978 | Mercurio ...................... 364/200 |
| 4,115,846 | 9/1978 | Laine ........................... 364/200 |
| 4,315,323 | 2/1982 | Bronisz et al. ................ 364/900 |
| 4,321,642 | 3/1982 | Fukuoka ....................... 360/137 |
| 4,337,659 | 7/1982 | Ragle ........................... 73/432 R |
| 4,338,644 | 7/1982 | Staar ............................ 360/137 |
| 4,338,644 | 7/1982 | D'Alayer de Costemore D'Arc ........................... 360/137 |

OTHER PUBLICATIONS

C. W. Hart, Magnetic Tape Library Audit Controls, IBM Technical Disclosure Bulletin, vol. 20, No. 1, Jun. 1977.
J. R. Bittihoffer, Correcting Tape Mount Errors, IBM Technical Disclosure Bulletin, vol. 24, No. 2 (Jul. 1981).

Primary Examiner—James D. Thomas
Assistant Examiner—Archie E. Williams
Attorney, Agent, or Firm—H. F. Somermeyer

[57] ABSTRACT

In a storage subsystem employing removable record media such as contained in a cartridge, each storage recorder has a multidigit alphanumeric display located immediately above a cartridge receiver. The symbols on the display are arranged to be aligned with the symbols on the cartridge when inserted into recorder so that visual correlation is facilitated. Each recorder has a microprocessor which controls the display in response to host supplied LOAD DISPLAY commands. Each command includes a cartridge identification field for displaying on the display for such verification as well as orders for setting up display modes and display sequencing. The recorder microprocessor will display status of the recorder in response to a control field of the LOAD DISPLAY message at predetermined drive states, display a cartridge number after a cartridge has been removed from the recorder (i.e., the number of the cartridge to be inserted), inhibit a recorder status message or error message until the recorder is READY, i.e., until the recorder is communicating with a control unit; and to selectively supply cartridge numbers of the cartridge in the recorder and a next cartridge to be inserted for effecting a cartridge exchange.

9 Claims, 11 Drawing Figures

STORAGE SUBSYSTEMS EMPLOYING REMOVABLE MEDIA AND HAVING A DIGITAL DISPLAY ON EACH RECORDER

FIELD OF THE INVENTION

The present invention relates to peripheral storage subsystems, such as those subsystems employing tape recorders, rotating disk recorders, strip recorders, card recorders and the like. More particularly, the invention relates to enhancing the integrity of such storage subsystems through the use of computer control and a digital display in the subsystem respectively mounted on each of a plurality of such recorders.

BACKGROUND OF THE INVENTION

In storage subsystems employing removable media, operator action is a major cause of errors which have resulted in a lack of data integrity. In tape media, such operator errors relate to exchange of media between various recorders and tape library storage. The various tape recorders in a subsystem are generally pooled for use by a plurality of host computers.

Many storage subsystems employing removable media have minimal checking for ensuring that the appropriate volume of removable media has been mounted for operation on the appropriate recorder. Such minimal checking provides but a minimum of data security for the various users. Now, it is desired to provide enhanced security for storage subsystem employing removable media.

Interaction of human operators with automatic and semiautomatic machines has involved the use of visual displays including digital displays for enhancing interaction relationships between the operator and automatic machines. For example, U.S. Pat. No. 3,573,749 shows an operator-prompting or interactive display system having a two-part command. One part of the command relates to a display character while a second part of the command relates to a control function directing the operator to a key or set of keys to be next actuated. Other systems employ computer-generated messages for directing operator action. For example, U.S. Pat. No. 3,260,999 shows a tape-controlled document distribution system wherein a plurality of documents are placed into respective subscriber boxes based upon a computer-driven display. The control of such displays has been programmed with a given program related to a particular portion of the display/or keyboard. U.S. Pat. Nos. 4,115,846 and 4,079,449 show the dedication of a computer program for controlling machine operations related to data being displayed on a visual display.

Even with all of the above-described interactive displays for operator prompting and assistance, storage subsystems employing the movable media have not yet achieved machine configurations which control operator error and enhance data and subsystem security.

SUMMARY OF THE INVENTION

It is an object of the present invention to provide a storage subsystem employing removable media with a display at each recorder and controlling the display in such a manner to enhance subsystem operation by reducing operator error and increasing data and subsystem security.

A storage subsystem employing the present invention may have a first plurality of recorders or record storage apparatus. Each such apparatus has a record member receiver, it preferably receiving a record member contained in a cartridge. A display on each of the recorders is positioned immediately adjacent to the receiver. Each of the recorders has a computer means with programs for controlling the display including sequencing and supplying informational content. A second computer means, commonly referred to as a control unit, is connected to all of the recorders and also is connected to a computer host for relaying messages between the host and the various recorders. Each of the computer means has a control memory portion for containing program indicia which determine the logic of operations of the subsystem. Each computer means also has a working store portion for storing operand signals. The computer means in each of the recorders includes logic control means operable in response to sensed recorder status for displaying such recorder status while inhibiting messages from a computer host, for example, identification of record member numbers on the display after the onset of displaying recorder status. The recorder also includes second logic controlling means inhibiting presentation of such status signals which are related to identification of a record member in a cartridge until the recorder computer means senses a removal of a record member currently in the recorder receiver and then immediately displays the record-member-related symbol signal indicating to the operator that a record member is to be inserted. Another logic means is responsive to first and second sets of symbol signals received from a host and is automatically operative to display a first set of symbol signals until the record member in the receiver is removed, and then to display a second set of symbol signals such that record members are exchanged in the recorder. Other controls are also provided for facilitating operator interaction between the recorder and a tape library, all under automatic control of a computer host. Further controls inhibit actuation of the display on a highly selective basis for preventing untimely exchanging of record members. Some host messages can be error codes generated by error recovery programs in the host relating to a given recorder.

The foregoing and other objects, features, and advantages of the invention will be apparent from the following more particular description of preferred embodiments of the invention, as illustrated in the accompanying drawings.

DETAILED DESCRIPTION

Figure 1:
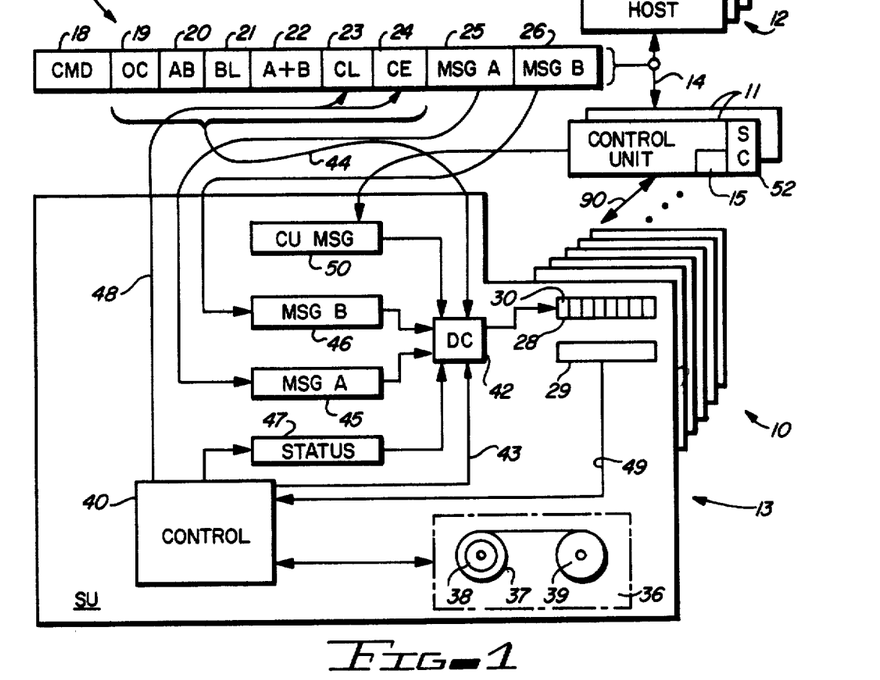
FIG. 1 diagrammatically illustrates a storage subsystem employing removable media which uses the present invention.

Referring now more particularly to the drawing, like numerals indicate like parts and structural features in the various diagrams. In particular, FIG. 1 illustrates a storage subsystem 10 adapted to operate with removable media, such as magnetic tape record storage members. The subsystem 10 includes a plurality of control units 11 for connecting one or more of a plurality of hosts 12 to a plurality of recorders or storage units, SU 13. Eash SU 13 has a separate tape transport apparatus 36 capable of removably receiving a magnetic tape on a spool 39, preferably via a cartridge receiver 29. Data signals are exchanged between a host 12 and one SU 13 by transferring signals over an input-output channel 14 through one of the control units 11; via a suitable electronic buffer 15, such as a random access memory; thence via a device to control unit interconnection 90. Such signal transfers are wellknown and widely practiced in the data processing arts.

In accordance with one aspect of the present invention, any of the hosts 12 can supply a supervisory type command to a control unit 11 for relaying to a selected SU 13 for actuating a display 28 within SU 13. Such commands are transferred over input-output channel 14 in accordance with publication GA 22-6974 entitled "IBM System/360 and System/370 I/O Interface Channel to Control Unit Original Equipment Manufacturer's Information" and available from International Business Machines Corporation, Data Processing Division, 1133 Westchester Ave., White Plains, N.Y., 10604. Such commands are decoded by circuits in control unit 11, which then generates operation control signals in accordance with the received command. The particular command received by control unit 11 from host 12 for controlling display 28 is shown as command word 17 including command byte 18, indicating it is a display command. Segments 19–24 constitute a display control byte for controlling the SU 13 circuits in connection with operation of display 28. Messages A and B for display 28, respectively denominated 25 and 26, are appended to control byte 19–24 for transfer to SU 13, as will become apparent.

In display command 17, section 19, labeled OC for overlay control, indicates to SU 13 to sequence of message presentations for messages A and B. The overlay control includes a first state (bit pattern) which permits an SU 13 generated message to overlay the host 12 message when the SU 13 accepts the next channel command that initiates tape motion. Such a command to SU 13 from host 12 is to withhold all recorder-generated messages until a host command is given to SU 13 via a control unit at 11 to move tape; for example, move tape from beginning of tape (BOT) to an addressed block of signals on the tape. Such channel command could also be a rewind to BOT, a recording command, a read command and the like. This type of control synchronizes the operation of display 28 with the execution of programs in host 12 such that operator action is closely synchronized to program status.

A second overlay control state indicates that messages 25, 26 cannot be overlaid by an SU 13 generated message until the current record member in the receiver 29 of SU 13 has been removed by the operator. This allows inhibition of other messages until the operator has followed host 12 generated instructions to remove the record member from SU 13. This action can be viewed as a security control procedure. If there is no record member in the recorder 13 when the command is received, overlay may occur immediately.

An additional overlay control state indicates that an SU 13 generated message should not overlay messages A and B received with the display command until a record member has been inserted into SU 13 receiver 29. An additional overlay control indicates that overlay of messages A or B by SU 13 generated messages can occur only after a record member is either removed or inserted to or from receiver 29.

Of course, additional host 12 determined conditions on display 28 can be imposed with respect to location of a record member with respect to SU 13. For example, if an automatic record member were attached to an SU 13, then operator control of that handler could have a significant relationship to the overlay control state just described.

Section 20, labeled AB, indicates that either message A only is to be displayed or that messages A and B can both be displayed. Depending upon the bit pattern or state of section 20, the messages can be alternated for indicating to an operator that an exchange of record members is desired, one message indicating the record member currently in SU 13 and a second message indicating which record member is to be inserted into SU 13.

Section 21 indicates whether or not the message displayed in display 28 is to be blinked on and off. Section 22 relates to the selection of messages A or B and their removal or overlay when a record member has been inserted into or removed from receiver 29; for example, message B only can be displayed, message A can be displayed first followed by message B, the reverse, or only message A can be displayed.

Sections 23 and 24 are reserved for allowing SU 13 to modify the display command. Section 23 results from SU 13 action causing the display 28 to be completely blank. Section 24 relates to certain characters to be displayed in display 28 relating to error conditions detected in SU 13. In such a situation, the end digit positions 30 of message displays 28 displays special symbols indicating the error display with the center digit positions displaying coded indications of the error conditions.

The transference of the DISPLAY command from a host 12 to a SU 13 is independent of whether or not the SU 13 is ready to operate, has received or not received a record member for recording/reproduction, has been selected, is free for selection, or is inactive such that recording operations cannot ensue until further manual intervention occurs.

Tape transport 36 of SU 13 cooperates with a record member 39 inserted into receiver 29, i.e., the record member 39 is a single spool of tape which is automatically opened and then threaded into SU 13 using automatic threading techniques. Tape transport 36 includes a machine reel 37 with a tachometer 38 which enables control of transport 36 by control 40 using known tape transporting techniques. SU 13 further includes a display control DC 42 which selectively activates display 28, as will become apparent. DC 42 receives the control byte 19–24 from control unit 11 and stores same for operating display 28 in accordance with host 12 commanded functions. DC 42 is controlled by control 40 as indicated by control lines 43, as will become apparent. In a preferred form of practicing the invention, control 40 includes a microprocessor 61 (FIG. 5) having a control store 62, an error index store 66, and status store 47. DC 42 includes a programmable logic array 231 (FIG. 9) for sequencing display 28 in accordance with the DISPLAY commands.

The messages 25, 26 are stored respectively in registers 45, 46 within the respective SU's 13. Such registers may be addressable registers within a random access memory. The status signals generated by SU 13 are transferred from status store registers 47 by control 40 to DC 42 for display on display 28. Control 40 also controls the signals of sections 23, 24 of control byte 19–24 via control lines 48, these section 23, 24 signals are then transferred to DC 42. Register 50 indicates the DC 42 may further respond to control unit 11 generated messages.

Line 49 indicates a connection between a sensor (not shown) within receiver 29 for indicating cartridge present or cartridge not present. Line 49 supplies a cartridge indication signal to control 40 for use in connection with the overlay control, previously described.

Figure 6:
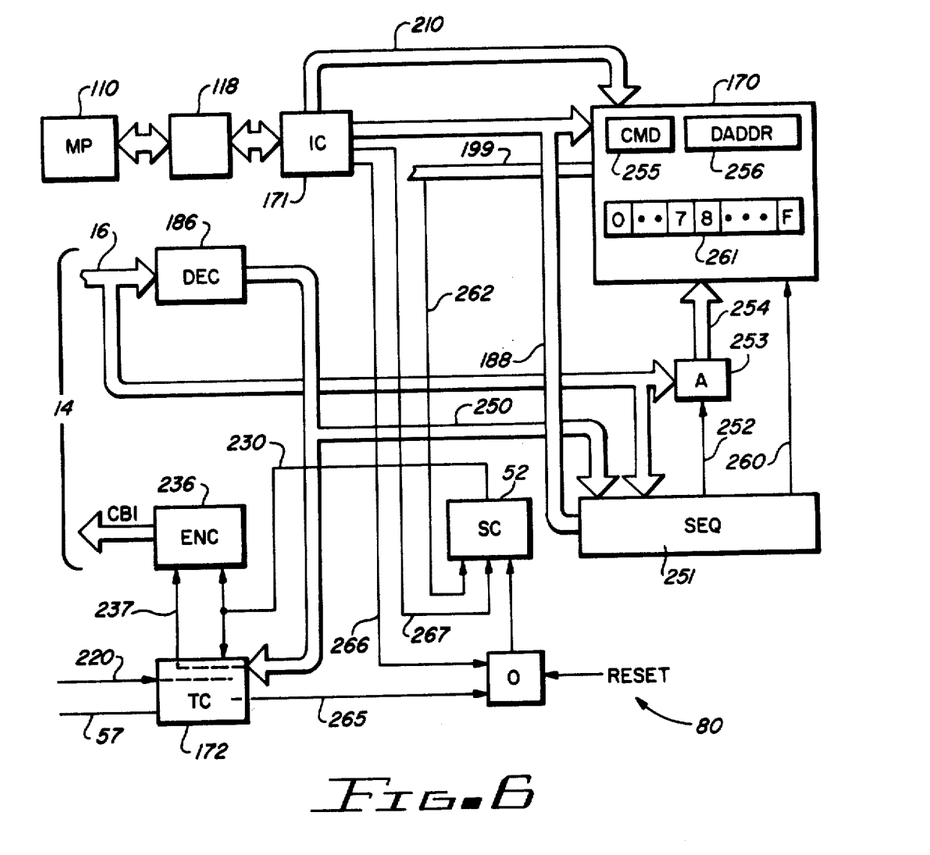
FIG. 6 is a logic diagram showing a so-called channel adaptor with control for selectively inhibiting a command related to a recorder display.

For subsystem integrity, the control unit 11 selectively responds to host 12 for inhibiting further displays during a chain of channel command words (CCW) representing a series of SU 13 operations. Such inhibition is contained within control unit 11 within control circuit SC 52 as shown in FIG. 6. That is, during a given chain of CCWs (series of channel command words) a plurality of display commands can be transferred from host 12 to SU's 13. After a certain point of operation is reached, it may be desired by host 12 to inhibit further display changes; then host 12 sends a special command to a control unit 11 for setting SC 52 to the active condition, which prevents further supervisory controls (SC), such as the display command, from being executed by subsystem 10. This action is shown in FIG. 6.

Figure 2:
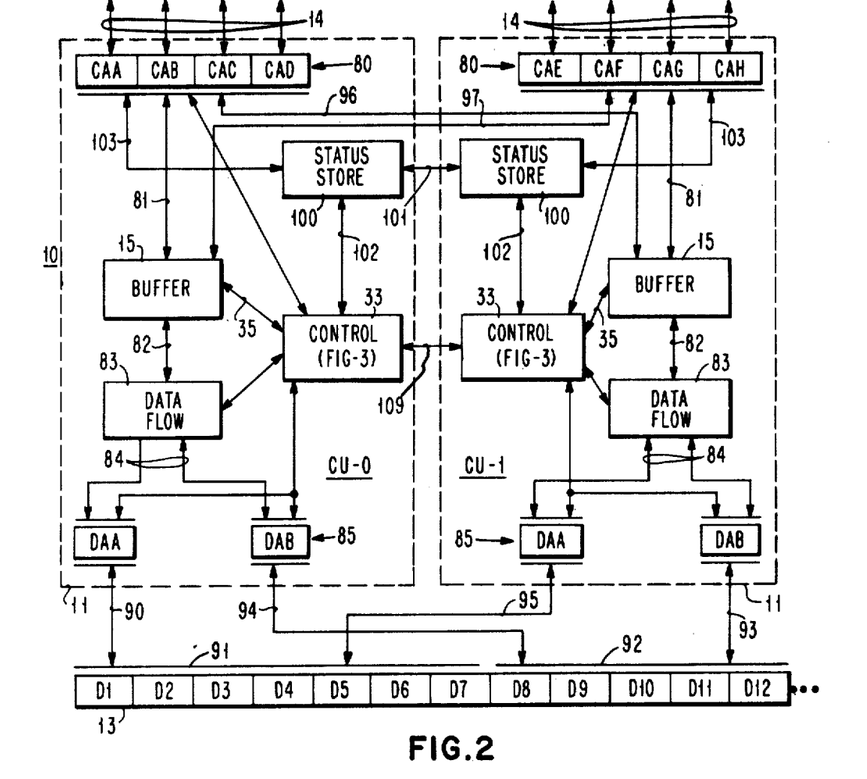
FIG. 2 is a logic block diagram of a two-control unit storage subsystem.
Figure 3:
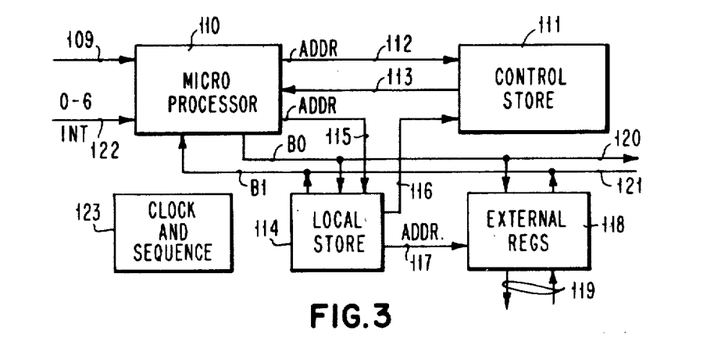
FIG. 3 is a logic block diagram of a control section for use with the FIG. 2 illustrated control unit.
Figure 4:
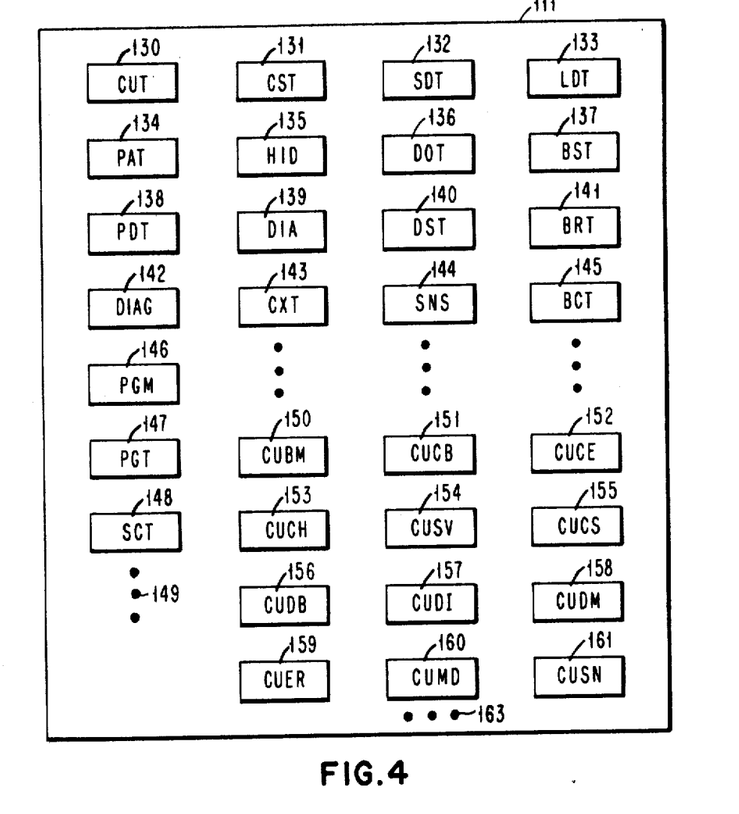
FIG. 4 is a map of a control store portion of a control unit computer means.

Before further describing the invention, the environment in which the invention preferably resides is described with particular reference to FIGS. 2-4, which illustrate a storage subsystem employing reel-to-reel tape drives denominated as devices 13 (D1–D12). The preferred arrangement includes two control units 11 also denominated as CU-0 and CU-1. The arrangement is such that any of the devices can be connected to the host 12 via input/output channel 14 through either of the control units, CU-0 or CU-1. The attachment to a host 12 by each of the control units 11 is via a plurality of channel adaptor circuits 80 which are individually denominated CAA-CAH. Each of the channel adaptors 80 can communicate directly with a buffer 15 in either control unit 11. Both CU-0 and CU-1 are identically constructed. Accordingly, like numerals are indicating like parts in the two control units with the interconnections between the control units being separately denominated. Channel adaptors CAA-CAD are in CU-0 while CAE-CAH are in CU-1. The respective channel adaptors communicate with a respective buffer 15 of the control units via cable 81. Communications from the buffers 15 to the devices 13 is over cable 82 through a data flow circuit 83, thence to cable 84 through a plurality of device adaptor circuits 85. The device adaptor circuits are separately denominated by characters DAA and DAB in both control units 11. Data flow circuits 83 contain known recording circuits. The programmed control 33 is electrically connected to all of the described portions of the respective control units 11 and operates generally in a known manner for storage subsystems as generally shown in Irwin U.S. Pat. No. 3,654,617, filed in United States of America Oct. 1, 1970, application Ser. No. 77,088.

The interconnections between the control units 11 and the devices 13 are on a primary/secondary basis. Devices D1–D8 are primary to CU-0 and secondary to CU-1. In a similar vein, devices D9–D16 (D13–D16 not shown) are primary to CU-1 and secondary to CU-0. The significance of primary and secondary connections relates to which of the control units CU-0 or CU-1 maintains status for the respective devices; i.e., the control unit CU-0 maintains status information for D1–D8 while CU-1 primarily maintains status information for D8–D16. As will become apparent, both control units CU-0 and CU-1 memorize status indications for all of the devices 13. In the primary connections, adaptors DAA-DAQ of CU-0 are connected via a cable 90 to all of the devices D1–D8. In a similar manner, the connections between D8–D16 and CU-1 are via cable 93 through its adaptors DAA-DAB. The secondary connection from CU-0 to devices D8–D16 is via cable 94 while CU-1 is connected to devices D1–D8 via cable 95. The connections between the device adaptors 85 and the various devices D1–D16 include tag control lines and bus data transfer lines which enable the control units 11 to closely control and operate devices 13.

In prior tape subsystems, the data flow paths were not fully multi-pathed in that the channel adaptors 80 communicated only with the data flow circuits 83 in its respective control unit 11. In the preferred configuration, any of the channel adaptors CAA-CAH can communicate with any of the devices 13 through either data flow circuit 83. The internal control unit 11 connections from the channel adaptors CAA through CAD and adaptors CAE-CAH of CU-1 are as previously described. Connections from channel adaptors CAA-- CAD to the buffer 15 of CU-1 are via cable 96, whereas channel adaptors CAE-CAH connect to the buffer 15 of CU-0 via cable 97. Accordingly, either data flow circuit 83 or buffer 15 can communicate with any of the hosts via any of the channel adaptors 80. This arrangement, of course, requires close coordination between control units 11.

The total subsystem status is maintained in each of the control units 11 via a pair of status stores 100. Status stores 100 communicate with each other via a cable 101 independent of data processing operations; that is, as soon as CU-0 changes status, such as by selecting a device 13, the status store 100 in CU-0 immediately communicates to status store 100 in CU-1. Similarly, any crossconnection between the channel adaptors 80 and the buffers 15 is immediately indicated in both status stores 100. Each of the status stores 100 contains a plurality of registers for containing bits relating to device status, buffer status, channel status and the like. Such status information reflects the selection status of the device, its busy status, contingent connections and all other status necessary for operating the storage subsystem with the input/output channel 14. One and only one control unit 11 can change the configuration of the storage system 10 at a given time. In this regard, cables 102 extend from the respective status stores 100 to controls 33. When control 33 of CU-0 wants to change logical configuration of the subsystem by selecting a device 13, for example, a control 33 communicates with its status store 100 and requests permission to change subsystem status. Status store 100 is in an appropriate master state and permits the control 33 to make a selection. Otherwise, status store 100 of CU-0 requests the status store 100 of CU-1 to give it the master state. Whichever control unit has the master state is the only one which can change logical configuration of the subsystem, the master state being shifted between the control units as configuration change needs dictate. Status stores 100 also communicate with the respective channel adaptors in the control units 11 via cables 103. Such communication includes the supplying of device busy status to the channel adaptors by the status stores and the request for selection from the channel adaptors to the status stores; that is, if CAB wants to select device D6 on behalf of a host request, CAB communicates with its status store 100 of CU-0 requesting that the device D6 be selected. Status store 100 will supply the busy or not busy status of D6 to CAB. CAB then immediately responds to the host request with respect to device D6, thereby reducing selection and inquiry time between a host 12 and control units 11.

Control 33 can take different configurations. The configuration preferred for use in connection with the FIG. 2 illustrated storage subsystem is shown in FIG. 3. A programmed microprocessor 110 operates in accordance with microcode programs (microprograms) stored in control store 111. Such microprograms enable microprocessor 110 to completely manage buffer 15, to supervise data flow circuit 83, to communicate with status store 100, and to supervise and enable selection of the channel adaptors 80 and adaptors 85. Further, communications between controls 33 in the two control units 11 on a processor-to-processor basis are via cable 109 using known interprocessor communications techniques. Using known techniques, microprocessor 110 selects the microprograms of control store 111 via address bus 112. Control data signals are supplied from the control store 111, including microprogram instruction words, via bus 113. Of course, the usual idle scan loop for operating microprocessor 110 is resident in control store 111. Additionally, each control 33 includes local store 114 which acts as a working control store for microprocessor 110. The addressable registers of local store 114 are addressed via bus 115. Bus 116 transfers signals from local store 114 to control store 111 under control of microprocessor 110; that is, it is preferred that the control data signals stored in control store 111 from microprocessor 110 be transferred via local store 114. Communications between control 33 and all of the items shown in the control units 11 are via sets of external registers 118 which are addressed by address signals supplied over bus 117 from local store 114, no limitation thereto intended. Communications from external registers 118 to the various elements of the control units 11 are via a pair of unidirectional buses 119, which electrical connections are made in the usual manner.

Microprocessor 110 includes bus out BO 120 and bus in BI 121 which are connected to local store 114, external registers 118 and other units as may be desired. Microprocessor 110 is interrupt-driven through a plurality of interrupt levels; these interrupts are supplied by the various elements of the control unit 11 over bus 122 which carries interrupt signals having levels 0 through 6, the priority of which is pre-assigned in accordance with the functions to be performed in the storage subsystem. The electrical signal timing of control units 11 is by a clock and sequencer 123. Not only does clock and sequencer 123 provide timing pulses, but it sequences microprocessor 110 for initializing control 33 to properly operate the control units 11. The connections 119 from external registers 118 are to all the other portions of control units 11.

FIG. 4 is a map of control store 111 showing control tables and microprogram groups. The tables, of course, contain those signals representing control information necessary for the successful operation of the storage subsystem. First the tables are described.

CUT 130 is a so-called control unit operation table which contains information-bearing signals pertaining to the entire control units 11. This table relates to the operational status of the individual control unit CU-0 and CU-1 which is not device 13 nor channel 14 related. CST 131 is a command status table which contains information-bearing signals describing the current command status that is being executed for an addressed device 13; that is, host 12 supplies channel commands over I/O channel 14 to the respective control units 11. CST 131 reflects the present status of the execution of those commands received by any of the channel adaptors 80. SDT 132 contains information-bearing signals signifying the status of a selected device 13. This table enables the control units 11 to closely control and operate any of the devices 13. LDT 133 is a so-called logical device table which contains information-bearing signals signifying the status of each of the devices 13 as those devices are logically extended into the buffer 15 and the broad operational status of the respective devices 13; this status information is more general in character than that appearing in SDT 132, for example. PAT 134 is the pending allocation table having information-bearing signals which queue the devices 13 by their respective addresses that require buffer space when buffer space has not yet been allocated. The table is preferably a FIFO (first in, first out) table. HID 135 is a table containing host identification signals for the hosts 12 communicating with the control units 11 via channel adaptors 80. DOT 136 relates to device operations and contains information-bearing signals signifying schedule, active and completed device 13 operations. Such operations include tape transport, reading and writing and the like. BST 137 contains information-bearing signals relating to the status of the buffer 15. Such information-bearing signals relate to data transfers into and out of the buffer, allocation of buffer space and other buffer related functions. PDT 138 contains information-bearing signals signifying the buffer space of the buffer 15 which can be deallocated from devices 13 as soon as the activity with respect to such buffer space ceases. Deallocation does not occur until such activity stops. DIA 139 contains information-bearing signals signifying device information. Control data relating to devices 13 concerned with input/output channel 14 as well as intercontrol unit communication over cable 109 are stored here. Such information may originate because of device 13 operations as well as channel 14 operations. DST 140 stores information bearing signals relating to device status; that is, the last device status presented by the device 13 to control units 11 is stored in this area. BRT 141 relates to the operation of buffer 15. This table identifies the status of records in the buffer 15. Each record in the buffer will be entered into BRT 141 and may contain characterizing signals showing the status of the record with respect to its storage in buffer 15.

DIAG 142 is a table used to control diagnostic functions executed in the control units 11. CXT 143 contains information-bearing signals relating to transfer of signals between buffer 15 and any of the I/O channels 14 via the channel adaptors 80. Such information includes direction of transfer and the address of the device 13 related to such transfer. SNS 144 holds information-bearing signals representing sense data to be reported to a host 12 as well as a so-called buffered log arranged by device 13 addresses. BCT 145 stores information-bearing signals relating to the dynamic logical address configuration of buffer 15. Such configuration will vary in accordance with the number of devices 13 connected to the control units, as well as whether there is one control unit 11 or two. PGM 146 is a so-called path group map which indicates which devices 13 may be logically connected to channel adapters 80 for logically partitioning the subsystem into one or more logical storage units. PGT 147 complements PGM 146 in that it includes identification signals identifying the logical partition as well as which of the channel adapters 80 is resident within each of the logical partitions. SCT 148 is a table containing signals relating to the idle scan for determining if any activity is to occur with respect to a given device 13. A diversity of actions can be instituted via SCT 148.

Numeral 149 indicates other tables not specifically referred to herein but that could be found in a constructed embodiment of the FIG. 2 illustrated storage subsystem. Such tables may include indications identifying the free space of buffer 15, priority queues for space of buffer 15, a segmentation indication for buffer 15, tracing status, timer tables for controlling time-outs and other miscellaneous areas necessary or desirable for constructing a multiple device storage subsystem.

Various microprogram or logic groups include CUBM 150 which are the microcode programs relating to the management of a buffer 15. CUCB 151 identifies those microcode programs or logic relating to the transfer of signals between an I/O channel 14 and buffer 15 via channel adaptors 80. CUCE 152 relates to setting up the tables described above in preparation for executing a command received from a host 12 over input/output channel 14. CUCH 153 relates to the channel control aspects, such as device selection and the like. CUSV 154 relates to an interrupt supervisor as it uses scan vectors in determining priority of the interrupts. CUCS 155 is a command support set of microcode logic which executes the command set up by CUCE 152. CUDB 156 relates to the control and supervision of signal transfers between devices 13 and either buffer 15. CUDI 157 relates to the control of the device adaptors 85 such as scheduling their operations, etc. CUER 159 relates to error detection and recovery. CUMD 160 relates to maintenance including diagnostic procedures executed by a control unit 11. CUSN 161 relates to handling sense data such as stored in SNS 144. Numeral 163 indicates that the above program groupings may be modified and extended as the need arises for a storage subsystem.

Figure 5:
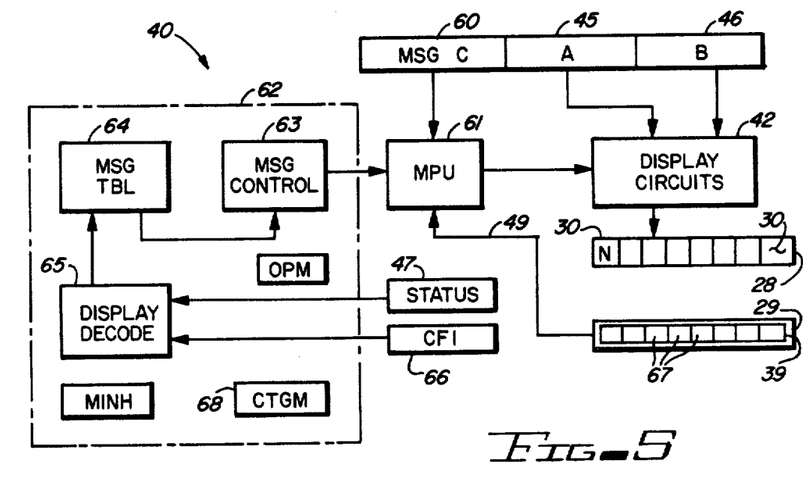
FIG. 5 is a logic block diagram of control circuits, including a computer means, for controlling a display in a recorder usable with the FIGS. 1 and 2 illustrated storage subsystems.

Referring next to FIG. 5, the control of display 28 is described. The message control byte 19-24 is stored in message control register 60, logically adjacent registers 45 and 46 containing messages A and B, respectively. In accordance with program indicia contained in control store 62, microprocessor (MPU) 61 receives the control byte for selectively transferring its contents to display circuits 42. A first logic program, message control 63, enables microprocessor 61 to the transfer of the display messages, including control byte 19-24 and messages A and B, to display circuits 42. Not shown in FIG. 5 are gating controls for gating the messages A and B from registers 45 and 46 to circuits 42. Additionally, message control logic module, or program 63, is operatively associated with a message table 64, which is a table look-up mechanism for converting SU 13 generated status and error message to a display code for human comprehension. Display decode logic module, or control program 65, enables MPU 61 to convert status information signals from register 47 and error information from CFI register 66 to a human sensible display. CFI register 66 in connected to sensors (not shown) for indicating the operational status of various portions of SU 13. Display decode logic module 65 enables MPU 61 to sense the signals from CFI 66 and compare same with the coding in message table 64 for generating a CFI code to be displayed in display 28. The term CFI indicates Coded Functional Index which directs an operator to a portion of SU 13 that relates to a sensed error condition.

Cartridge or record member receiver 29 is disposed directly below display 28 such that the digit positions of display 28 are vertically aligned with the volume-identifying digit positions 67 of a record member 39. This arrangement facilitates the record member comparison of identification with the number indicated in display 28. Detailed operations of the FIG. 5 illustrated logic arrangement are found in FIGS. 9, et seq.

The host display command 17 can be inhibited during a chain of channel commands by the receipt of a so-called MODE SET command which, among other things, specifies operating modes of a subsystem, including whether or not a display command can be received. Such control by control unit 11 is handled by one of its channel adaptors 80, one of which is shown in simplified form in FIG. 6. These channel adaptors 80 each communicate with microprocessor MP 110 of control 33, also shown in FIG. 6. A set of external registers 118 couples channel adaptor 80 to microprocessor 110. A sequencing circuit IC 171 (IC means Internal Communications) sequences the transfer of signals between microprocessor 110 and the other elements shown in FIG. 6. Each channel adaptor 80 includes a random access memory 170 for containing status and other control data signals associated with communications between hosts 12 and control unit 11. One of these stored elements is a channel command to be performed and stored in register 255. The device address stored in register DADDR 256 relates the command stored in register 255 to an addressed one of the SU's 13. Other status information is not shown except for control of the display command corresponding to SC 52. A register 261 has 16 bits, one bit for each SU 13, which are attachable to a pair of control units 11. The bits are enumerated zero through F (hexadecimal). When a bit in register 261 is set to a binary 1, then a display command is inhibited; if a bit is a binary zero, then a display command can be accepted and executed by subsystem 10 for the corresponding device 13. Upon the completion of a chain of channel commands, the bit in register 261 corresponding to the device associated with the CCW chain is always reset to zero. When a command associated with a device address is received by the FIG. 6 illustrated channel adaptor 80, the contents of the associated bit in register 261 are transferred over cable 199, thence line 262 to single bit register SC 52. SC 52 memorizes the bit for the current operations to control the acceptability of a display command for the current CCW chain. The control of SC 52 will become apparent from a continued reading.

Numeral 16 denotes a channel bus-out portion of input/output channel 14. This can be an 8-bit wide plus parity bit bus for receiving signals from a host 12. When channel bus out 16 contains a command signal, a tag line (not shown) termed COMMAND OUT signifies to the channel adaptor 80 that the signals on channel bus out 16 are indeed a command. In that case, known circuits (not shown) direct the signals to decoder 186 which decodes the command and supplies a decoded version of the command over bus 250 to sequencing control 251 and to tag control circuits 172. Sequencing control 251 responds to the command signals for sequencing operations of memory 170 and the other units in channel adaptor 80. For example, a MODE SET command requires that one byte of auxiliary data be associated with that command. Accordingly, the next set of signals received over channel bus out 16 will be that auxiliary byte, which should be stored in a predetermined register in memory 170. Accordingly, sequence unit 251 supplies an activating signal over line 252 in synchronism with receipt of a second byte over channel bus out 16 for passing the received signals through AND gates 253, thence over cable 254 to be stored in memory 170 in the predetermined register. This additional byte contains a control signal "inhibit" that signifies whether or not DISPLAY command can be subsequently received within the present chain of commands. If a DISPLAY command is to be inhibited, then sequencing control 251 directs the bit "inhibit supervisory commands" contained in the auxiliary byte of the MODE SET command to the appropriate bit position of register 261. When DADDR 256 contains a device 13 address corresponding to bit 8 of register 261, then a MODE SET command in a CCW chain related to the SU 13 numbered 8, then bit 8 of register 261 receives the inhibit portion of the contents of the auxiliary byte for inhibiting a later acceptance of a DISPLAY command in the instant chain. Immediately after the MODE SET command, sequence unit 251 automatically transfers the numerical contents of bit 8 of register 261 over cable 199 and line 262 for setting SC 52 in accordance with this last received MODE SET command. For example, in a single CCW chain, the first command received in the chain may be a MODE SET command which permits a DISPLAY command to be accepted. After 35 commands have been handled, some of which may be DISPLAY commands, a second MODE SET command can be received. This second MODE SET command can have an auxiliary byte that inhibits subsequent acceptance of DISPLAY commands. At this time, and only at that time will SC 52 be set, and will remain set for the remainder of the CCW chain. IC (Internal Communications) PLA 171 provides the bilateral communications between MP 110 and the illustrated channel adaptor 80. For example, MP 110 may require access to memory 170. IC 171 transfers the address for memory 170 received from MP 110 over cable 188 to memory 170. Cable 188 also carries address signals from sequencing control 251. MP 110 may also wish to set SC 52 to the active condition because of some error recovery procedures being executed under its control. Along that line, IC 171 relays such setting signals over line 267 to set SC 52. In a similar manner, MP 110 can also reset SC 52 by a signal supplied over line 266.

In the event a DISPLAY command is received during inhibit time, a UNIT CHECK signal is sent to the display requesting host 12. SC 52 supplies its inhibit signal over line 230 to TC PLA 172 and to encoder 236. TC 172 responds to the decoded command received from decoder 186 over bus 250, and compares it with the inhibit signal received over line 230. When there is a compare, then encoder 236 is activated by TC PLA 172 via a signal over line 237 to generate a code indicating that the DISPLAY command just received has been command rejected. This code is supplied over the channel bus-in portion of I/O channel 14 (labeled CBI). In addition to the described operation, TC 172 supplies and controls all tag signals with respect to input/output channels as set forth in the above-referenced interface describing document.

When an end of chain signal is received over line 220 (SUPPRESS OUT has been deactivated), TC 172 supplies a clearing signal over line 265 to reset SC 52. The UNIT CHECK signal is supplied as an alert signal over line 57 of interface 14 to the host 12. It is to be understood that the channel adaptor 80, represented by showing in FIG. 6, provides many functions not herein described. The only description for FIG. 6 relates to the control of the receipt of DISPLAY commands, all other operations being beyond the scope of the present description.

Figures 7, 8:
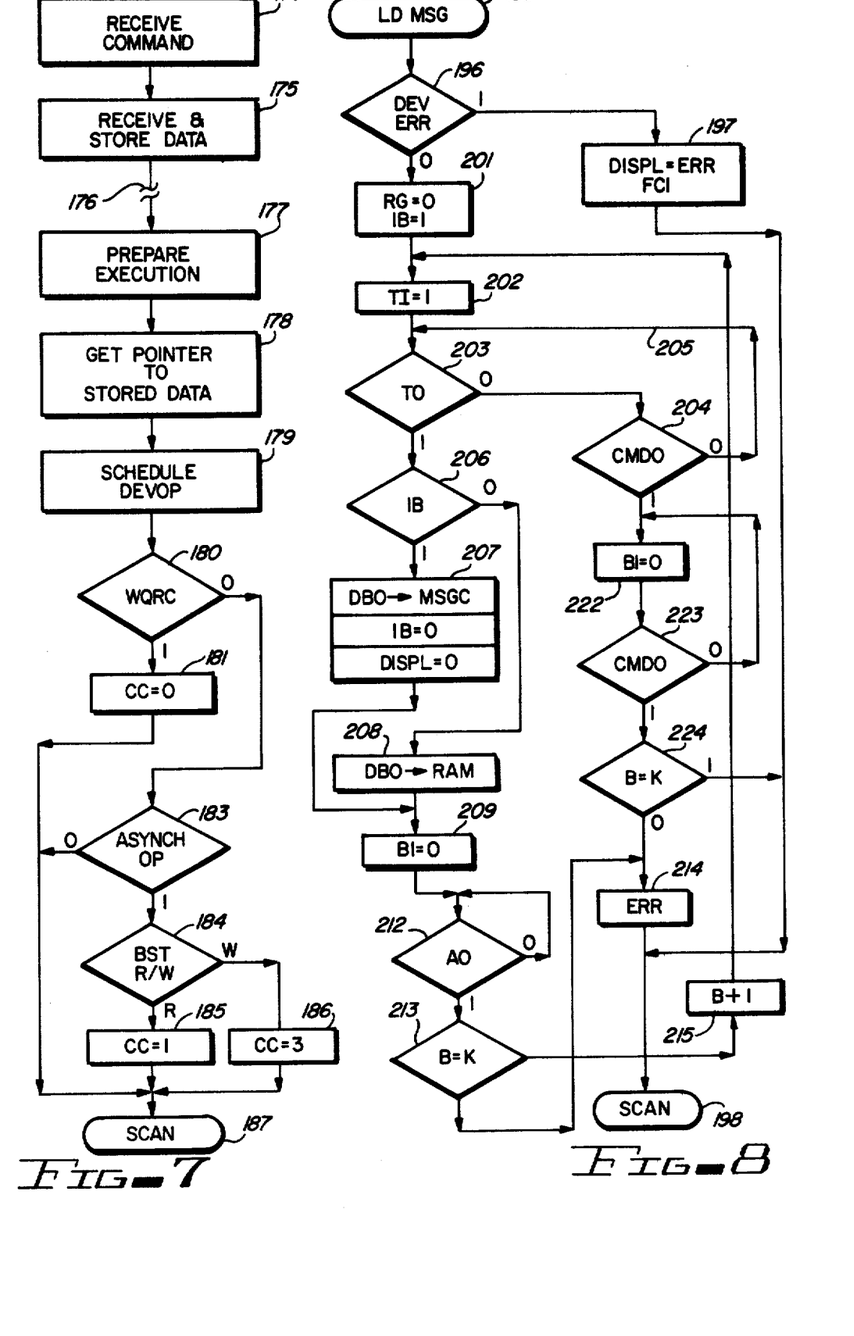
FIG. 7 is a logic diagram illustrating a host display command being processed through a control unit to a recorder.
FIG. 8 is a logic diagram illustrating a recorder microprocessor control for receiving a host-generated display command and for transferring the display command to the FIG. 9 illustrated display circuit.

FIG. 7 illustrates the logic of control unit 11 used to transfer a received DISPLAY command to the addressed device SU 13. At 174, the command is received. It should be noted that channel adaptor 80 portion of control unit 11 determines whether or not the DISPLAY command is acceptable. If the command is acceptable, at 175 the command is received along with the display control data indicated by numeral 17 in FIG. 1. The display control data is initially stored in memory 170 of channel adaptor 80, then transferred to control store 111 of control 33; from there it is transferred to SU 13 in the following described manner. After the data has been stored in memory 170 at step 175, control unit 11 may perform other operations asynchronously to receipt of a DISPLAY command, which causes a slight delay in transmittal to SU 13. These other higher priority operations, even though preferably limited, are indicated by numeral 176. Next, control unit 11, control 33, prepares for execution of the received command at 177. At 178, an address pointer is retrieved from control store 111 which points to the stored control data signals in memory 170. Upon retrieving that stored data, a device SU-13 operation is scheduled at 179, i.e., for this command the device operation is the transference of the DISPLAY command from control unit 11 to the addressed SU 13. Such a request for transfer of control signals is queued in a so-called work queue, labeled WQRC. If the operation is queued, then all that is required is to transfer the display control data signals represented by numeral 17 to SU 13. Such a transfer is not a continuing command requiring repetitive attention by control unit 11. Accordingly, the continuing command signal (CC) is set to zero at 181. The bit CC is contained in command status table CST 131. If the scheduled device operation was not queued at 179 and as detected at step 180, control unit 11 at 183 determines whether or not a current asynchronous operation between control unit 11 and the addressed SU 13 exists. If not, the control unit 11 returns to the scan condition at 182 for scanning for additional work. However, if an asynchronous operation is currently occurring, as detected at 183, the buffer status table BST 137 is interrogated to determine whether or not the asynchronous operation is a read or a write. If it is a read, then the continuing command, i.e., attention to the just received command, is set to unity, indicating the current read operation is to be followed by the just scheduled display control data transfer operation. If the current asynchronous operation is a write (received on tape in SU 13), the continuing command code is set to a 3 at step 186 to signify the current write is to be followed by a transfer of the just-received display control data to the addressed SU 13. All of these codes are stored in CST 131.

FIG. 8 illustrates the logic of device control 40 for the addressed SU 13 as contained in logic module 63 of control store 62 as it controls MPU 61. MPU 61 decodes a received command in the same manner that channels adaptor 80 decoded the command, i.e., MPU 61 determines that it is a DISPLAY command being received. As such, MPU 61 reads and responds to logic module 63 as detailed in FIG. 8. First of all, at 196, MPU 61 determines whether or not there is an outstanding device error, i.e., CFI 66 is non-zero. If such is the case, that error condition takes precedence over the receipt of the DISPLAY command; an error code is displayed in display 28 at step 197. On the other hand, in the usual case, there is no device error; then at step 201, MPU 61 clears an internal work register (not shown), denominated RG, for receiving the byte of data enumerated by numerals 19–24; the command byte 18 of data field 17 has already been received and decoded. The connection between control unit 11 and SU 13 at 90 (FIG. 2) is two bytes wide; accordingly, the logic of FIG. 8 toggles between the first and second byte such that the bytes can be stored in successive memory addresses within control store 62 via a byte-wide transfer bus (not shown). This transfer is achieved in step 201 by setting the 1B byte to 1, i.e., the first byte is coming in. At 202 a tag-in to control unit 11 similar to the data-in/data-out tags of the IBM 370 computers is activated, indicating that a first byte can be received. At 203, a tag-out from control unit 11 is sensed. If TO (data tag-out) is inactive, at 204 the CMDO tag-out (COMMAND-OUT indicating end of operation) is sensed. If CMDO tag is not active, then MPU 61 follows path 205 to complete a loop to wait for control unit 11 action. As soon as the tag-out at 203 is received, at 206 the 1B bit is sensed. If it is the first byte, then the DBO (Data Bus Out from control unit 11) signals are sent to the message control register 60. The 1B bit is reset, and the display circuits DC 42 are reset, as will become apparent. On the other hand, if it is not the first byte, i.e., not the display control byte, then at 208 the signal contents of the Data Bus Out of interconnection 90 are sent to control store 111 for later transmittal to random access memory RAM 241 (FIG. 9) in display circuits 42. The addressing of that memory is controlled internally by DC 42 in synchronism with receipt of bytes from control unit 11. At that time, a second input line (not shown) B1 is reset to zero at 209. Next at 212, MPU 61 waits for the occurrence of a clock-out signal from control unit 11, denominated as AO. This AO clock-out signal synchronizes the transfer of signals from control unit 11 to the addressed SU 13. As soon as the AO clock-out is received, then, at 213, MPU 61 determines whether or not the last byte has been received (B=K). Since the display command always has a predetermined number of bytes, i.e., message A, message B plus the control bytes, the byte counter in RG is compared with a constant K. If the byte counter indicates that K bytes have been received, and really, only the first byte should have been received, then an error condition is signaled at 214. MPU 61 then returns to scan at 198 to look for work with respect to other functions of SU 13, as well as handling the error condition.

Returning to step 203, when TO is inactive, and CMDO is active at 204, then BI is reset at 222. CMDO is sent at 223 and the MPU 61 is in a loop until CMDO is active. Then B=K is sensed at 224 (similar to 213). If B=K, then all of the bytes have been received and scan 198 is returned to. If it is not equal, and CMDO has been received at 223, i.e., control unit 11 has indicated that all of the bytes have been transferred, an error condition is signaled at 214.

Figure 9:
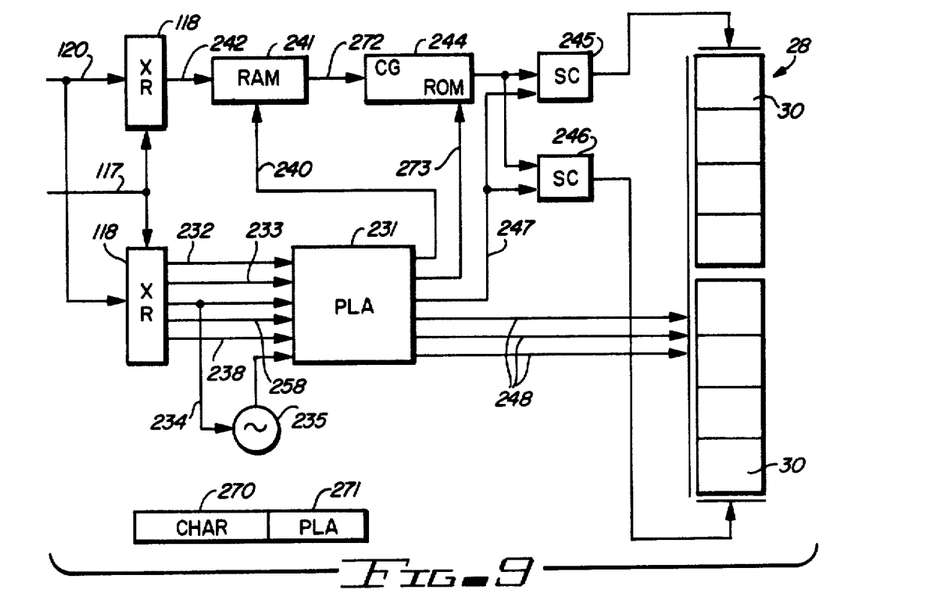
FIG. 9 is a block diagram of a display circuit for controlling the display in each of the recorders usable with the FIGS. 1 and 2 illustrated storage subsystems.
Figure 10:
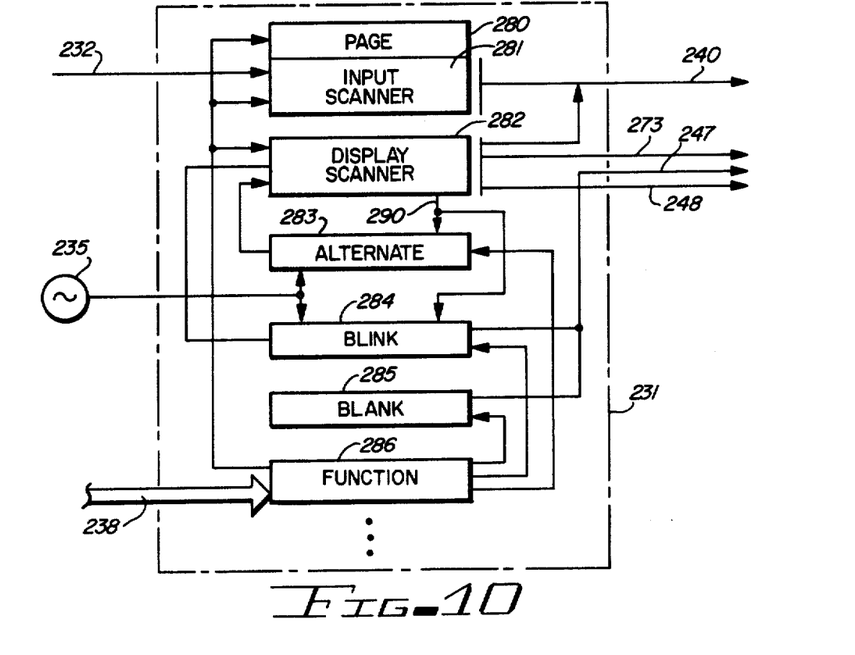
FIG. 10 is a logic diagram illustrating the sequence control for the circuits of FIG. 9 as embodied in a programmable logic array.

Returning to step 213, if B=K and COMMAND OUT have not been received from control unit 11, then at 215, MPU 61 increments RG by unity as indicated by the symbol B+1. DC 42 is explained with respect to FIG. 9. DC 42 has two external registers 118 for receiving data from MPU 61. The data is received over bus 120 with the registers 118 being selected by address signals received from MPU 61 over address lines 117. First the control byte is transferred through the XR 118 attached to PLA 231. PLA 231 is a programmable logic array having logic circuits as represented in FIG. 10, later described. Messages A and B are transferred through the upper XR 118 and over cable 242 to RAM 241 in preparation for display on display 28. MPU 61 signals to PLA 231 that the messages A and B are to be received by setting a byte in the lower XR 118 that activates line 232 for initiating PLA 231 to sequence through a set of addresses for RAM 241 via address lines 240 to receive the bus 120 bytes. These (messages A and B) bytes are transferred from MPU 61 over bus 120 through bus 242 to RAM 241. After RAM 241 is loaded with messages A and B, corresponding to loading registers 45 and 46 of FIG. 1, the control byte of the display command is transferred to PLA 231 via cable 238 for interpretation. It was mentioned that DC 42 is reset at the beginning of a display cycle. This reset is achieved by a reset signal transferred to PLA 231 via line 233 from the attached XR 118. Timing signals for PLA 231 are supplied over line 234 from XR 118; therefore, that XR 118 is updated periodically by MPU 61 to synchronize operation of DC 42 with the remainder of the control circuits for SU 13. Additionally, the timing signals from MPU 61 on line 234 synchronize the blink and alternate clock 235. Clock 235 determines the length of time that a message to be blinked remains active on a display 28 or how long two messages are displayed in an alternating fashion. Line 258 carries time-out control signals from MPU 61 to PLA 231, the significance of which is not important to an understanding of the present invention.

Once the messages A and B are stored in RAM 241, they are supplied over cable 272 to a character generator, which is a ROM denominated by numeral 244. The sequencing of ROM 244 is under PLA 231 control via line 273, which represents a plurality of individual address control lines. In other words, the ROM character generator 244 is controlled jointly by RAM 241 and PLA 231 on a digit-by-digit basis. The output of ROM 244 goes to a pair of display sequence controllers 245 and 246, which provide driving electrical signals for the luminaries in the digit positions of display 28. For example, SC 245 supplies the driving electrical currents for the upper four digits of display 28, while SC 246 supplies the driving electrical currents for the lower four digits of display 28. Each of the digits in display 28 may have five wide by seven high sets of LEDs (light emitting diodes). The term wide and high refers to the orientation as shown in FIG. 9. SC 245 and 246 are also sequenced by PLA 231 by control signals received over lines 247. Lines 248 carry selection signals from PLA 231 to the various digit positions of display 28 which are in synchronism with the ROM 244 operation. In fact, RAM 241, ROM 244 and display 28 are all synchronized using the same scanning mechanism in PLA 231. The operation of ROM 244 is further explained in FIG. 9, showing that portion 270 of the ROM address are supplied over lines 272 has a character input from RAM 241. The PLA output on lines 273 is supplied as portion 271 of the ROM 244 address. The combination of portions 270 and 271 provides a complete address for the ROM 244 for supplying its output signals to SC 245 and 246, that is, ROM 244 is a character generator based upon table look-up wherein the table look-up is governed by the addressability of the stored codes.

FIG. 10 illustrates the logic circuits of PLA 231 used to control the display 28 and to receive messages A and B and the control byte for those messages to be displayed. RAM 241 receives messages A and B when line 232 is in the active state. A line 232 signal activates input scanner 281 which cycles through the RAM 241 sixteen addresses, one address at a time. Input scanner 281 is further modified by a page control circuit 280, which selects the upper eight addresses of RAM 241 or the lower eight addresses of RAM 241. The upper addresses correspond to register 45 while the lower addresses correspond to register 46 of FIG. 1. Function block 286 activates page circuits 280 to select a page using known techniques, i.e., a binary trigger (not shown) controls which ranges of addresses are scanned. In this manner the line 232 signal activates the input scanner 281 to scan through all 16 addresses. The page circuit 280 is more of interest when displaying either message A or B.

The addresses generated by scanner 281 for RAM 241 are transmitted over cable 240 in the usual manner. Additionally, display scanner 282 provides memory addresses over cable 240 in the same manner as input scanner 281. Display scanner 282 also supplies digit selection signals over lines 248 which are matched with the ROM 244 addressing signals sent over lines 273. Line 247 goes to SC 245 and 246 from later described circuit portions of PLA 231.

Alternate circuit 283 receives the alternate commands from function register 286 received over bus 238. Alternate circuit 283 is timed by the output of oscillator 235 and actuates display scanner 282 to alternate accessing of characters from the upper and lower portions of RAM 241 for alternating display of messages A and B. Display scanner 282 synchronizes operation of the alternate circuit 283 by supplying an end-of-scan signal over line 290. Alternation occurs upon receiving an oscillator 235 signal and an end-of-scan signal over line 290.

In a similar manner blink circuit 284 is timed by oscillator 235 to alternate between displaying a given message and a blank display. Blink circuit 284 is synchronized by the end-of-scan signal on line 290. Blink circuit 284 supplies its output signals over line 247 for synchronizing operation of SC 245 and 246. A blink circuit 285 blinks display end digits 30 for displaying the CFI codes. This again is controlled by function register 286 corresponding to the CE field 23 of display control 17. Blink circuit 285 is controlled by the CL section 22 (FIG. 1). PLA 231 may include other controls for providing greater flexibility to display 28.

It was mentioned that the display of volume identification is synchronized by certain overlay command states as to the insertion, removal or presence of cartridges (CTG) containing record members into and out of receiver 29. This control of messages is implemented in MPU 61 as well as in circuits 42 as a portion of logic module 63 detailed in FIG. 11. Logic module 63 is activated by the receipt of a DISPLAY command. This module is entered by MPU 61 at 300. A cartridge memory control bit CTGM C290 (FIG. 5) is sampled at 301. This memory bit 68 (CTGMC) indicates a binary control over module CMSG based upon a cartridge in receiver 29. If the memory bit 290 is active, than at 302, MPU 61 senses the actual presence or absence of a cartridge by sensing line 49. If line 49 signal indicates there is no cartridge, then a cartridge memory bit CTGM 68 is reset at 303. If a cartridge is present in receiver 29, CTGM is set to "1" at 291. CTGMC 290 is reset at 292. Then at 304, MPU 61 senses whether or not a message display is inhibited (MINH). MINH indicates that a device message is inhibited in deference to receipt of a DISPLAY command in accordance with the overlay control mentioned above. If MINH=0, then at 305 MPU 61 determines whether or not a device message is present. If so, at step 306, MPU 61 determines if it is a diagnostic message, i.e., CFI 66 is non-zero. If no diagnostic message (CFI=0) is required, then MPU 61 returns to an activating logic module looking for additional work. If the diagnostic message is active, than at 307 MPU 61 determines whether or not a cartridge is in receiver 29 by sensing a signal on line 49. If there is a cartridge in receiver 29, then the message can be displayed and the MPU 61 returns to the calling module. If there is no cartridge in receiver 29, then a diagnostic message bit corresponding to field 24 of display command is reset at step 308.

Figure 11:
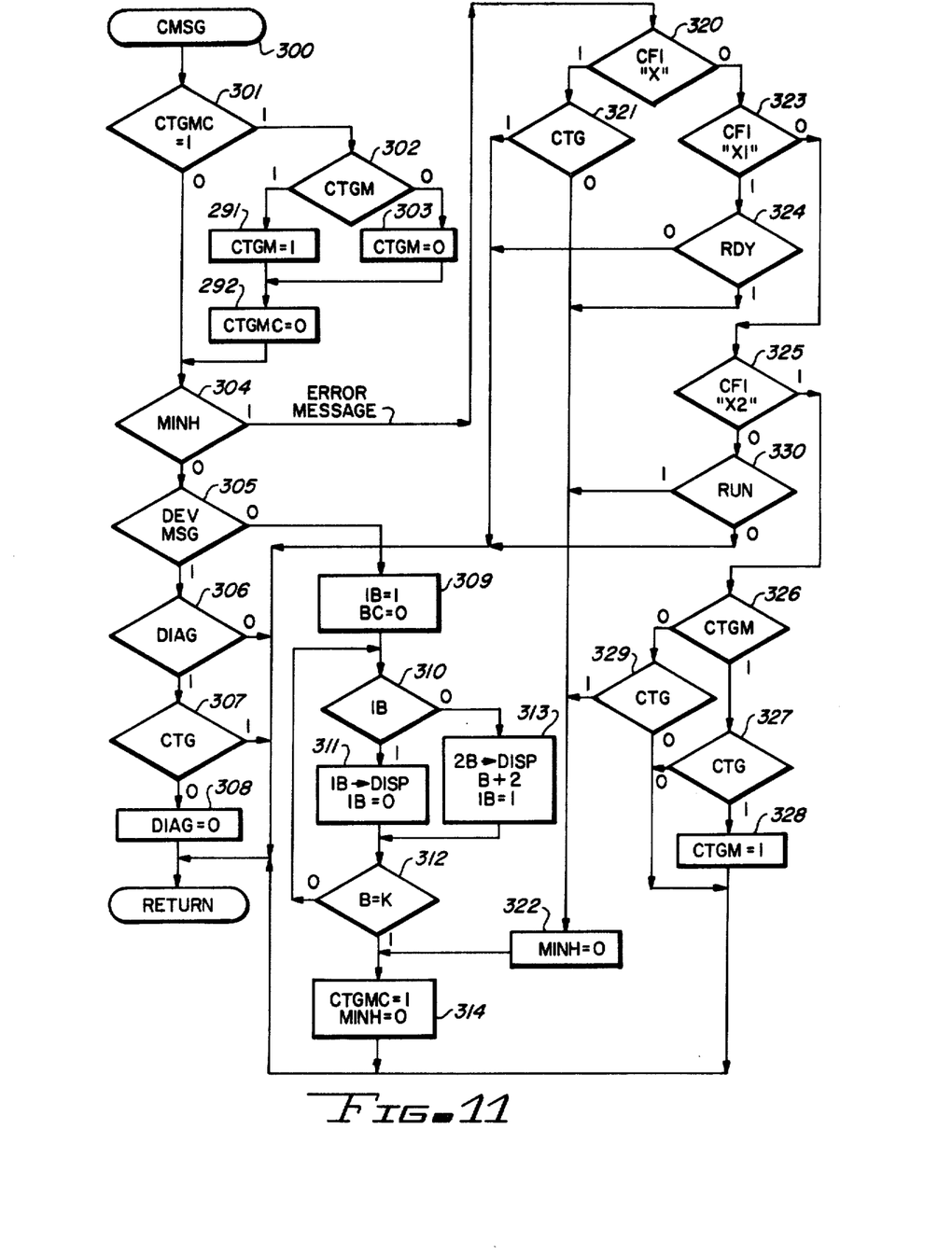
FIG. 11 is a logic diagram showing the logic of operations of a recorder using computer control related to the sequencing of a recorder display in accordance with commanded display operations received from a host.

Returning to step 305, if there is no device message, and the device messages are not inhibited, then at step 309 a first byte indicating bit 1B is set to unity and the byte count BC is set to zero. Steps 310, 311, 312, and 313 are a toggle arrangement for converting a 16 bit (2 byte) receipt of information to a series of single byte successive entries for RAM 241. Since such toggling is well-known, it is not further described. When the messages are completely in RAM 241, MPU 61 at 312 determines that the byte count is equal to the constant K, then MPU 61 at 314 sets CTGMC=1 and the inhibit message control bit MINH (control store 62) is set to zero.

Returning to step 304, if the device messages are inhibited, an error message is to be displayed. At 320 MPU 61 determines whether or not a given CFI code used for message inhibit is equal to an integer X, i.e., is in a first class of error messages. These CFI codes represent diverse operational status as compared with the overlay control codes. If CFI is in class integer X, than at 321, MPU 61 senses line 49 for the presence or absence of a cartridge in receiver 29. If there is a cartridge present, then MPU 61 returns to a calling module for action to be taken beyond the scope of the present description. If there is no cartridge present, then inhibit MINH is reset at 322 and then step 314 is performed. If the CFI code is not equal to X, then at 323, MPU 61 determines whether or not the CFI code is in class X1. If it is in X1, then one of the CFI codes relating for the device 13 to become ready is sensed at 324. If SU 13 is READY (CFI code no longer applies), then inhibit MINH is reset to zero at 322 for allowing the received messages A or B to be displayed on display 28. On the other hand, if the device is not READY, the microprocessor 61 returns for other work, and then will later re-enter CMSG at 300 for sensing for the READY condition.

If the CFI code is not X1 at 323, then at 325 CFI code for class X2 is sensed. If the class is X2, then at 326, MPU 61 determines the state of CTGM 290. At 327, the presence of a cartridge is sensed, if there is a cartridge, then CTGMC 68 is set to unity at 328. On the other hand, if CTGM is zero at 326, then any cartridge in receiver 29 is sensed at 329. If there is a cartridge in receiver 29, then the message inhibit MINH is reset to zero at 322, otherwise MPU 61 returns to other work. On the other hand, if the CFI code is in class X2 is not met at 325, then at 330, MPU 61 senses whether or not a tape motion command has been received and the device is operating (RUN). If RUN=0, MPU 61 returns without further action; otherwise the inhibit MINH is reset at 322. These last logic steps all relate to implementation of the execution of the overlay codes with the CFI codes being related to the several states of overlay described with respect to section 19 of the display control byte.

While the invention has been particularly shown and described with reference to preferred embodiments thereof, it will be understood by those skilled in the art that various changes in form and details may be made therein without departing from the spirit and scope of the invention.

What is claimed is:

1. A data storage system adapted to be attached to a host and having a first plurality of addressable record storage apparatus, each apparatus having a cartridge receiver adapted to receive a record member with each record member having indicia arranged on the record member to remain exposed outside said record storage apparatus when the record member is in the receiver, said host supplying peripheral instructions including a display instruction to the data storage system, each said peripheral instruction including address designations of a one of said record storage apparatus and to supply tag control signals;

the improvement comprising:
a first plurality of computer means at each of said record storage apparatus for controlling same, including motion control, status sensing and reporting and sensing the status and actuation of said cartridge receiving means;
a second computer means connected to all of said record storage apparatus and said first plurality of computer means and also connected to said host;
each of said computer means having a control memory portion for containing indicia of programs of instructions and a working store portion for storing operand signals;
each said record storage apparatus having a display means located immediately adjacent and aligned with said receiver to display symbols respectively aligned with said indicia on a record member residing in said receiver such that there is a visual symbol-indicia correspondence and being coupled to the first computer means, respectively;
said second computer means including indicia of programs of instructions for enabling the second computer means to receive display instructions and for relaying said received display instructions to a one of said first computer means addressed by said host, each said received display instruction having display signals and control signals adapted to respectively actuate one of said first computer means to sense for cartridges in said receiver means, sense drive status and to identify first and second record members, each of said first computer means having logic controlling means including indicia of programs of instructions for enabling the respective first computer means to actuate a respective one of said display means as a one of said first computer means in a one of said record storage apparatus, as follows:
first indicia means in the first computer means control memory for enabling said one first computer means in response to a received one of said display instructions to sense a predetermined status, some of which are cartridge related, of said one record storage apparatus to display such status in the display means of the one record storage apparatus and to remove the cartridge number indication from said display means upon onset of said predetermined status;
second means for enabling said one first computer means to inhibit presentation of said status by said display means of the one record storage apparatus which are cartridge related until said one first computer means senses removal of said first record member then currently residing in the receiver of the addressed record storage apparatus and then to display said second record member identification display signals; and
third means for enabling said one first computer means to respond to said first and second of identification display signals to display in the display means of the one record storage apparatus said first identification signals until the first cartridge in said receiver is removed, and then to display said second identification signals in the display means of said one record storage apparatus whereby a host-instructed record member exchange is visually displayed at said one record storage apparatus.

2. A magnetic tape recorder having a receiver to receive a tape-containing cartridge with an end portion of said cartridge being exposed outside said recorder when residing in said receiver, said end portion having visual tape identification receiving digit positions, means for transporting said tape past a transducer station;

the improvement comprising;
a multidigit visual display juxtaposed to said receiver and having digit positions aligned with said identification-receiving digit positions of a cartridge residing in said receiver;
an electrical switch in said receiver positioned to be activated by a cartridge in said receiver to indicate presence or absence of a cartridge including insertion and removal of a cartridge;
display control means coupled to said multidigit visual display for supplying display signals to said visual display, said display control means including first means for storing a first message to be displayed for electrically indicating a first cartridge, second means for storing a second message to be displayed for electrically indicating a second cartridge, third means for storing a third message for electrically indicating recording operational status, fourth means for storing signals electrically indicating what display function of a plurality of display functions is to be performed, a first display sequencer connected to said fourth means for enabling a predetermined timed actuation of said display to alternately transfer the contents of said first means and contents of said second means to said display to alternately display said first and second messages for alternately visually indicating said first cartridge residing in said receiver and said second cartridge to be inserted into said receiver and connected to said switch and being responsive to removal of said first cartridge to display only said second message.

3. The recorder set forth in claim 2 further including means in said first display sequencer to blink said second message on and off until said switch indicates a cartridge is inserted into said receiver.

4. The recorder set forth in claim 2 further including a second display sequencer connected to said third means and to said switch for being responsive to said switch to overlay contents of said visual display with contents of said third means.

5. The recorder set forth in claim 2 further including a third display sequencer connected to said switch and to said third means for inhibiting transfer of the recorder operational indicating contents of said third means to said visual display until said switch indicates insertion of a cartridge.

6. A data storage subsystem (10) adapted to be attached to at least one host computer (12) and having a plurality of addressable record storage units (13), each storage unit having a receiver (29) for an exchangeable record member (39), and being capable of receiving instructions from a host computer through a channel (14) and at least one control unit (11), characterized in that each storage unit has a display (28) adjacent to and aligned with the receiver, whereby identification indicia on a record member in the receiver can be readily compared with symbols of the display, sensing means to supply a signal (49) to indicate the presence in or absence from the receiver of a record member, each storage unit (13) and control unit (11) including computer means (61, 110), the control unit computer means being responsive to a display command having an address for an addressed one of the record storage units and received from a host computer requiring operator intervention to exchange record members or to insert a record member, to control the addressed record storage unit computer means, to remove any display of symbols representing a record member then present in the receiver, to indicate the need for removal of such record member from the receiver, and then to display symbols representing a record member to be inserted in the receiver upon sensing of such removal.

7. A subsystem according to claim 6, in which the received host computer display command includes messages identifying symbols representing both the record member to be removed from and the record member to be inserted into the receiver of the addressed storage unit, and a display sequencer in the addressed storage unit being operable to alternately display symbols in the display of the addressed storage unit identified by the messages until removal of the record member from the receiver of the addressed storage unit is sensed.

8. A subsystem according to claim 6 or 7, including means in the addressed storage unit to blink the display in the addressed storage unit after the removal of one record member has been sensed until the insertion of another record member in the receiver of such addressed storage unit is sensed.

9. A subsystem according to claim 6 or 7, including means in the addressed storage unit to display in said display of the addressed storage unit symbols indicating operational status of the addressed storage unit after insertion of a record member in the receiver of the addressed storage unit has been sensed.

* * * * *